Patented Sept. 5, 1933

1,925,739

UNITED STATES PATENT OFFICE 1,925,739

METHOD OF PREPARING AMMONIUM SULPHATE

Daniel Vorländer, Halle-on-the-Saale, and Albert Lainau, Pfitzdorf, near Gerlebogk, Germany, No Drawing. Application August 21, 1930, Serial No. 476,944, and in Germany August 21, 1929

6 Claims. (Cl. 23—119)

Of the various metallic salts which accelerate the speed of oxidation of ammonium sulphite to ammonium sulphate, the complex salts of cobalt have hitherto not been recognized and utilized.

According to the literature, it has been observed that cobalt salts have only a slight influence upon the oxidation of sodium sulphite in acid solution, even in the feebly acid carbonic acid solution, and also that the complex salts of cobalt show no activity in ammonical solution.

We have succeeded, however, in oxidizing ammonium sulphite in a far more effective manner than hitherto by employing as a catalyst the brown or yellowish brown soluble cobalt-sulphito-ammonia-complex salts which exert a catalytic influence on the reaction which greatly exceeds that of other similarly acting substances. The reaction is a specific one; impurities in the cobalt-sulphito complexes, e. g. salts of iron, manganese, nickel, alkaline or alkaline earth metals and salts of the acids of arsenic, have little influence as long as the concentration of these foreign substances is small in proportion to the concentration of ammonium sulphite and cobalt.

Also, instead of employing ammonium sulphite itself as a starting product in the preparation of ammonium sulphate, our process offers the possibility of utilizing the sulphur dioxide present, for example, in waste carbon dioxide burnt gases and roast gases derived from poor sulphur-bearing ores, by reacting upon it with air and ammonia in the present of cobalt-sulphito-ammonia complex salts. The oxidation speed of sulphur dioxide is increased by increasing either the oxygen pressure or the oxygen concentration and by raising the temperature.

It is important that the cobalt should be easily separable from the ammonium sulphate obtained after the oxidation is completed. This may be effected, for example, by precipitating the cobalt as one or more of its sulphides by means of hydrogen sulphide or ammonium sulphide, and separating the small amount of cobalt necessary to maintain the oxidation from the resulting ammonium sulphate solution. This sulphide of cobalt may then be oxidized in ammonical, neutral or acid suspension with air, ozone or hydrogen peroxide; or it may be oxidized and dissolved electrolytically. The cobalt solution thus obtained may be used again for the preparation of a further quantity of ammonium sulphate from ammonia, sulphur dioxide and oxygen.

The ammonium sulphate may be removed from the final mixture by crystallization in the ordinary manner and the cobalt-containing mother-liquor again brought into the ammonium sulphite oxidation process.

If air is used as the source of oxygen, the latter is removed rapidly and completely at temperatures below 70° C. Thus the residual gas, being composed almost wholly of nitrogen, may be used for various other purposes.

Since the older processes for chemical separation of oxygen from the nitrogen of the air have been found to be technically impracticable, an alternative method is provided here which avoids the expensive process of obtaining nitrogen by the liquefaction of air.

Some examples of the method according to the invention are given in the following.

*Example No. 1*

An aqueous solution containing $6 \times 10^{-2}$ to $6 \times 10^{-5}$ gram-mol of cobalt sulphate and 0.1 gram-mol of ammonia per liter, is fed into the top of a reaction chamber and comes into contact with a mixture of air, sulphur dioxide and ammonia which enters at the foot of the chamber. Suitable means are provided in the chamber for ensuring that the solution and gases are thoroughly mixed. For this purpose the reaction chamber may comprise a number of chambers arranged one above the other and connected together by inlet and outlet pipes, each chamber having, for example, perforated trays, layers or stacks of inactive broken material, which provide a tortuous path for the substances passing through the reaction chamber.

The nitrogen and inert gases which separate from the oxygen escape from an exit pipe and may be collected for other use. The oxygen of the air alone (without sulphur dioxide) changes the ammoniacal cobalt solution into a violet-blue (purple) cobalt-ammonia complex solution, and with sulphur dioxide, a yellow-brown cobalt-sulphito-ammonia complex solution is obtained which does not contain cobalt ions (ready for immediate precipitation as cobalt sulphide with ammonium sulphide.)

Oxygen, sulphur dioxide and ammonia are added in such amounts to this brown, catalytically exceedingly active solution that the solution retains its alkaline reaction. (pH value about 8 to 9.)

If the solution, which is heated by the reaction, begins to precipitate solid ammonium sulphate, the supply of ammonia and sulphur dioxide is cut off and air is passed through the solution to oxidize any ammonium sulphite which may be present. The ammonium sulphate solution is then removed from the chamber and allowed to crystallize. In a test, the crystalline ammonium sulphate separated from the matrix, after a single washing with a little cold water and after drying, was found to contain 0.006% cobalt. The salt may then be further purified by re-crystallization. The mother-liquor containing the cobalt salt and the wash-waters are united, concentrated if necessary, and again supplied to the reaction chamber together with ammonia, sulphur dioxide and air for counter-current circulation.

As an alternative method of separation, the cobalt present in the final solution may be precipitated as its sulphide and the ammonium sulphate liquor may then be removed by decanting or by filtration and allowed to crystallize. The cobalt sulphide residue can be redissolved, for example, by oxidation in a warm ammoniacal suspension, and used again in the reaction chamber.

Instead of using ammonia in aqueous solution, a solution of ammonium carbonate offers the advantage that the concentration of ammonium ions may be increased, if required, by the addition of solid ammonium carbonate at the beginning of the process. Also, the loss of ammonia which is carried off by the atmospheric nitrogen passing out of the reaction chamber is thereby diminished.

*Example No. 2*

Solid ammonium sulphite is moistened with an aqueous solution of a cobalt-ammonia complex salt and atmospheric oxygen is passed over the paste which is stirred by an agitator. When the oxidation is complete, the ammonium sulphate is separated from the paste and purified in the manner described in Example No. 1.

We claim:—

1. Method of preparing ammonium sulphate by reacting ammonium sulphite with gases containing free oxygen in the presence of soluble cobalt-sulphito-ammonia salts.

2. Method of preparing ammonium sulphate by subjecting sulphur dioxide to the action of oxygen and ammonia in the presence of a solution of a cobalt-sulphito-ammonia salt.

3. Method of preparing ammonium sulphate by reacting an aqueous ammoniacal solution of a cobalt-sulphito-ammonia-complex-salt with a mixture containing ammonia, oxygen, and sulphur dioxide.

4. Method of preparing ammonium sulphate by reacting an aqueous solution of a cobalt salt and ammonium carbonate with a gaseous mixture of ammonia, air and sulphur dioxide.

5. Method of preparing ammonium sulphate which consists in bringing a gas containing free oxygen into contact with a paste formed by moistening solid ammonium sulphite with a small quantity of an aqueous solution containing a complex cobalt ammine, agitating said paste, separating and purifying the ammonium sulphate from the paste on completion of the reaction, and recovering the cobalt for use in a further cycle of operations.

6. Method of preparing ammonium sulphate by causing the mutual chemical combination of ammonia, sulphur dioxide and oxygen in a solution of a cobalt-sulphito-ammine, the quantities of the reagents being such that the said solution retains its alkalinity, characterized by a pH value of approximately 8 to 9.

DANIEL VORLÄNDER.
ALBERT LAINAU.